(12) United States Patent
Sjong

(10) Patent No.: US 8,580,337 B2
(45) Date of Patent: Nov. 12, 2013

(54) THERMOPLASTIC COATING AND REMOVAL USING BONDING INTERFACE WITH CATALYTIC NANOPARTICLES

(75) Inventor: Angele Sjong, Louisville, CO (US)

(73) Assignee: Empire Technology Development LLC, Wilmington, DE (US)

( * ) Notice: Subject to any disclaimer, the term of this patent is extended or adjusted under 35 U.S.C. 154(b) by 1034 days.

(21) Appl. No.: 12/618,670

(22) Filed: Nov. 13, 2009

(65) Prior Publication Data

US 2011/0114260 A1    May 19, 2011

(51) Int. Cl.
*B05D 5/00* (2006.01)

(52) U.S. Cl.
USPC ........ 427/203; 427/202; 427/551; 427/407.1; 427/412.1; 427/412.3; 427/412.4; 427/412.5

(58) Field of Classification Search
USPC .................. 427/202, 203, 551, 407.1, 412.1, 427/412.3–412.5
See application file for complete search history.

(56) References Cited

U.S. PATENT DOCUMENTS

| | | | |
|---|---|---|---|
| 3,349,018 A | 10/1967 | Potts | |
| 3,766,031 A | 10/1973 | Dillon | |
| 5,248,326 A * | 9/1993 | Burton | 71/8 |
| 7,474,919 B2 | 1/2009 | Ye et al. | |
| 2005/0014004 A1 | 1/2005 | King et al. | |
| 2005/0164169 A1* | 7/2005 | Malak | 435/5 |
| 2007/0141114 A1 | 6/2007 | Muisener et al. | |
| 2008/0210120 A1 | 9/2008 | Foukes et al. | |
| 2011/0111002 A1* | 5/2011 | Pop | 424/422 |

FOREIGN PATENT DOCUMENTS

| | | |
|---|---|---|
| JP | 2004253482 A | 9/2004 |
| JP | 2007266593 A | 7/2012 |
| WO | 2006008518 | 1/2006 |
| WO | 2007114893 | 10/2007 |

OTHER PUBLICATIONS

Portnoy, Robert C., "The Gamma Radiation Tolerance of Polypropylene: Measurement and Enhancement," Medical Device Link, Medical Plastics and Biomaterials Magazine, Jan. 1996, 6 pages.

Obuchi et al., Decomposition of Mixed Plastics Consist of Polypropylene and Polyethylene Terephthalate into Fuel Oils over Titania/Silica Catalyst, Proceedings of the 1st International Symposium on Feed Stock Recycling of Plastics, 1999, pp. 127-130.

Ali et al., "Thermal and Catalytic Decomposition Behavior of PVC Mixed Plastic Waste With Petroleum Residue," Elsevier Science BV, Journal of Analytical and Applied Pyrolysis, vol. 74, Mar. 9, 2005, pp. 282-289.

Panasonic, "Panasonic Uses Catalytic Reaction to Decompose Plastics Into Harmless Gases," http://www.dexigner.com/product/news-g13846.html, Mar. 2, 2008, 1 page.

International Search Report and Written Opinion, issued in International Patent Application No. PCT/US2010/052519, mailed Dec. 16, 2010, 16 pages.

Biddle, M. B., et al., "An Overview of Recycling Plastics from Durable Goods: Challenges and Opportunities," IdentiPlast II Conference Reprint, Apr. 26-28, 1999, pp. 25.

Daniel, M-C, and Astruc, D., "Gold Nanoparticles: Assembly, Supramolecular Chemistry, Quantum-Size-Related Properties, and Applications toward Biology, Catalysis, and Nanotechnology," Chem. Rev. vol. 104, No. 1, pp. 293-346, American Chemical Society (2004).

O'Neal, D.P., et al., "Photo-thermal tumor ablation in mice using near infrared-absorbing nanoparticles," Cancer Letters, vol. 209, pp. 171-176, Elsevier Ltd (2004).

Trafton, A., "Targeting tumors using tiny gold particles," accessed at http://web.mit.edu/newsoffice/2009/gold-cancer-0504.html, May 4, 2009, pp. 3.

Ye, J.Y., et al., "Enhancement of laser-induced optical breakdown using metal/dendrimer nanocomposites," Appl. Phys. Lett., vol. 80, No. 10, pp. 1713-1715, American Institute of Physics (2002).

Zijlstra, P., et al., "Five-Dimensional optical recording mediated by surface plasmons in gold nanorods," Nature, 459, pp. 410-413 (2009).

* cited by examiner

*Primary Examiner* — William Phillip Fletcher, III
(74) *Attorney, Agent, or Firm* — Pepper Hamilton LLP

(57) ABSTRACT

An article may be fabricated by coupling a thermoplastic to a bonding interface layer, and applying a coating layer to the surface of the bonding interface layer. A bonding interface layer may comprise catalytic nanoparticles embedded within and/or encapsulated by one or more radiatively unstable polymers. Application of ionizing radiation to the article may release a catalyst at the bonding interface. Application of heat and/or stress to the article may enhance catalytic degradation of the remaining bonding interface and uncoupling of the thermoplastic from the coating layer. Embodiments of methods, compositions, articles and/or systems may be disclosed.

10 Claims, 11 Drawing Sheets

600

601
Prepare a thermoplastic for application of a bonding interface layer to a surface of the thermoplastic

603
Apply catalytic nanoparticles and polymers to the thermoplastic surface, wherein the polymers have an unstable radiative characteristic to facilitate removal of the coating through degradation of the bonding interface using at least in part a radiative process

605
Prepare the bonding interface layer and/or thermoplastic for application of a coating to the bonding interface layer and/or thermoplastic

607
Apply the coating over the bonding interface layer

609
Process the coating, the bonding interface layer and/or the thermoplastic to enhance or initiate bonding and/or hardening

801
Apply ionizing radiation to an article comprising an interface layer disposed between a thermoplastic and a coating, the interface layer comprising catalytic nanoparticles and polymers, wherein the polymers have one or more radiatively unstable characteristics, and wherein the application of ionizing radiation to the interface layer causes degradation of the polymers and/or release of the catalytic nanoparticles

803
Apply at least one of heat and/or mechanical force to the article to enhance catalytic degradation of an interface between the thermoplastic and the coating by the catalytic nanoparticles, the catalytic degradation and application of heat and/or mechanical force causing separation of the thermoplastic and the coating

805
Process the thermoplastic and the coating separately

Fig.13

THERMOPLASTIC COATING AND REMOVAL USING BONDING INTERFACE WITH CATALYTIC NANOPARTICLES

BACKGROUND

Unless otherwise indicated herein, the materials described in this section are not prior art to the claims in this application and are not admitted to be prior art by inclusion in this section.

Engineered thermoplastics may be coated with another polymer to improve texture, color and/or longevity. Recycling coated thermoplastics may present a challenge since the coating typically has to be removed in order to obtain quality recyclable thermoplastics. When the coating is not removed, the coated thermoplastics to be recycled may have reduced commercial value, and possibly may be used in low-valued applications, such as synthetic wood products. Currently, decomposition of the entire substrate may be employed to recycle plastic.

It has been estimated that the percentage of the approximately 100 million metric tons of thermoplastics generated globally each year not recycled may be as high as 80% or more. The major sources of coated thermoplastics may be the auto and/or electronic industries. For the auto industry, because of increased fuel efficiency concerns, thermoplastics use may be increasing in recently years. In particular polycarbonate glazings may be in high demands, as plastic windows may be increasingly sought after to improve fuel economy and stylistic features of vehicles.

BRIEF DESCRIPTION OF THE FIGURES

The presently disclosed subject matter is particularly pointed out and distinctly claimed in the concluding portion of the Specification. The foregoing and other features of the present disclosure will become more fully apparent from the following Detailed Description and appended Claims, taken in conjunction with the accompanying Figures. Understanding that these Figures depict example embodiments in accordance with the disclosure and are, therefore, not to be considered limiting of its scope, the disclosure will be described with additional specificity and detail through use of the accompanying Figures, in which:

FIG. 10 illustrates a flow chart of a coating method including application of a bonding interface layer and a coating layer to a thermoplastic;

DETAILED DESCRIPTION OF EMBODIMENTS

Figure 1:
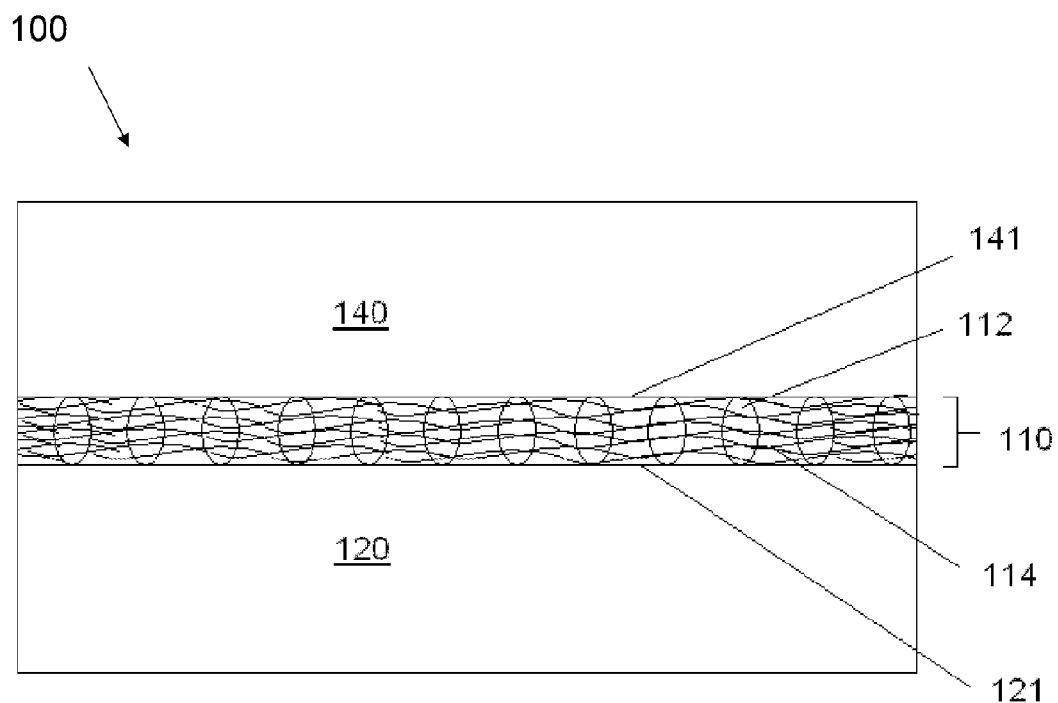
FIGS. 1-5 illustrate block diagrams of an article with a bonding interface layer comprising polymers and catalytic nanoparticles.

The present Description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following Detailed Description, reference is made to the accompanying Figures, which form a part hereof. In the Figures, similar symbols typically identify similar components, unless context dictates otherwise. The illustrative embodiments described in the present Detailed Description, Figures, and Claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, articles, compositions, systems and processes related to coating and/or removal of a coating from a thermoplastic surface. As used herein, a "thermoplastic" can be any polymer that can be softened and remolded/reshaped after an initial molding/shaping. A thermoplastic can include any polymer that can be softened by heating and hardened by cooling. A thermoplastic can be a polymer that exhibits leather, rubbery of viscous flow at temperatures above the glass transition temperature of the polymer, or exhibits viscous flow at temperatures above a melting temperature (e.g. crystalline melting temperature) of the polymer. "Thermoplastic" may be used in reference to a surface, a layer, a material, a component, or structure that comprises a thermoplastic (e.g. "thermoplastic layer", "thermoplastic surface", etc.). A "thermoplastic surface" can include a surface of a thermoplastic article/object, a surface of a thermoplastic coating on an article/object, a surface of a thermoplastic sheet/film, or any other surface that includes a thermoplastic.

As used herein, "polymer" can be any molecule comprising two or more structurally similar/identical monomers coupled by a chemical bond. Chemical bonds can be covalent bonds, ionic bonds, hydrogen bonds, van der Waals' interactions and/or any other chemical bond known in the art. "Monomer" as used herein can be any molecule capable of forming a chemical bond with at least two additional similar/identical molecules to form a sequence of repeating units. "Monomer" can encompass, but is not limited to, monomeric species known in the art such as olefins, propylenes, ethers, styrenes, ethylenes, fluoroethylenes, tetrafluoroethylenes, ethylene propylenes, esters, carbonates, urethanes, vinyl chlorides, vinyl chloride acetates, amides, imides, acetals, methylpentenes, methyl methacrylates, sulfones, urethanes, acrylics, styrene acrylics, acrylonitrile, and any other monomeric species known in the art. "Monomer" can also encompass monomeric species with structures that are based on, or are modifications of, one or more of any of the named or unnamed monomeric species above.

"Polymer" as used herein can include any and all species of "copolymer," which can be any polymer comprising at least two different monomeric species A and B (e.g. ether and propylene), which can be arranged in any way (e.g. alternating A and B monomers, alternating A and B polymers, repeated sequences, randomly disposed, block arrangements, etc.). "Polymer" as used herein can encompass "terpolymer," which can be any polymer comprising at least three different monomeric species, and any molecule comprising four or more different monomer species in any arrangement. "Polymer" as used herein can encompass polymers with any and all secondary, tertiary, and/or quaternary structures, side groups.

As used herein, a "radiatively unstable polymer" can be any polymer with one or more physical or chemical characteristics, structures or properties modifiable by exposure to ionizing radiation, wherein the modification of the characteristic/structure/property by the exposure can be associated with physical and/or structural degradation of the polymer. Degradation of a "radiatively unstable polymer" by exposure to ionizing radiation can occur as a result of chain scission and/or cross-linking caused by excitation/ionization of one or more atoms of the radiatively unstable polymer. Application of ionizing radiation to a radiatively unstable polymer can cause embrittlement, discoloration, odor generation, stiffening, softening, grafting, cross-linking, changes in saturation, oxidation, cyclization, isomerization, amorphization, and/or crystallization, resulting in a reduction of molecular weight, chain length, and/or structural integrity of the polymer. As used herein, an "unstable radiative characteristic" can be any physical or chemical characteristic of a polymer that enhances or promotes degradation of the polymer upon exposure to ionizing radiation. Examples of unstable radiative characteristics can include, but are not limited to, aliphatic or branched structure, low molecular weight, wide molecular weight distribution, high density, crystallinity/formation of a semi-crystalline solid phase, low antioxidant levels, lack of side groups, and oxygen permeability.

As used herein, a "metal" can be any metal element of the periodic table of elements, incorporated by reference herein. "Metals" can comprise one or more alkali metals, alkaline earth metals, transition metals, and/or rare earth metals, alone or in combination, and can include one or more of the following metal elements: hydrogen (H) in its metallic state, lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), gallium (Ga), indium (In), tin (Sn), thallium (Tl), lead (Pb), bismuth (Bi), element 113 (Ununtrium) (Uut), element 114 (Ununquadium) (UUq), element 115 (Ununpentium) (Uup), element 116 (Ununhexium) (Uuh), scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), rutherfordium (Rf), dubnium (Db), seaborgium (Sg), bohrium (Bh), hassium (Hs), meitnerium (Mt), darmstadtium (Ds), roentgenium (Rg), element 112 (Ununbium) (Uub), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and/or lawrencium (Lr).

As used herein, a "catalyst" can be any substance that initiates a chemical reaction or increases the rate at which a chemical reaction occurs (e.g. oxidation of a polymer). "Catalytic" may be used to describe any element, compound, or substance that can act as a "catalyst." Also, as used herein, a "nanoparticle" can be any molecule or discrete group of molecules that does not exceed approximately 100 nanometers (nm) in length in at least one dimension (e.g. length, width, height, diameter, etc.).

As used herein, a "catalytic nanoparticle" can comprise a catalyst. A catalytic nanoparticle can also comprise one or more polymers/copolymers, such as a radiatively unstable polymer/copolymer. As used herein, a "composite nanoparticle" can comprise a catalyst at least partially encapsulated within one or more radiatively unstable polymers/copolymers. A catalytic nanoparticle can be an unencapsulated catalyst, a catalyst embedded within one or more polymers, or a composite nanoparticle. Therefore, where the phrase "catalytic nanoparticle" is used in the text and illustrated in the Figures, it may refer to any or all of these species.

As used herein, a "bonding interface" can be an interface at which two layers, objects or substances are physically/chemically bonded. A bonding interface can be a surface that forms a common boundary between two layers, objects or substances directly coupled at the common boundary by a chemical bond. A bonding interface can be an additional layer, object or substance that forms a boundary between two layers and is directly coupled to them. A bonding interface can also comprise each of those interface types. For example, a thermoplastic layer can be directly coupled to a coating along a bonding interface, with a bonding interface layer disposed intermittently between the thermoplastic layer and the coating.

For ease of description, examples in this Detailed Description may refer to embodiments that include "polymers." However, it is to be understood that in various embodiments, "polymers" may refer to one, two or more or more polymers/copolymers. Similarly, examples in this Detailed Description may refer to embodiments that include "thermoplastic." However, it is to be understood that "thermoplastic" may refer to one, two or more or more polymers/copolymers that meet the requirements of a "thermoplastic" as defined above.

The present disclosure generally describes techniques suitable for use in the construction or recycling of composite materials. An article may comprise a thermoplastic coupled to a bonding interface layer, with a coating layer applied to the surface of the bonding interface layer. A bonding interface layer may comprise catalytic nanoparticles embedded within and/or encapsulated by one or more radiatively unstable polymers. Application of ionizing radiation to the article may release a catalyst at the bonding interface. Application of heat and/or stress to the article may enhance catalytic degradation of the remaining bonding interface and uncoupling of the thermoplastic from the coating layer. Embodiments of methods, compositions, articles and/or systems may be disclosed and claimed.

Various embodiments may include methods, articles, processes and/or compositions adapted to facilitate coating and/or removal of a polymer coating from a thermoplastic. Articles may include a coated thermoplastic provided with a bonding interface layer, which may comprise catalytic nanoparticles, disposed between the thermoplastic and the coating. The catalytic nanoparticles may comprise a catalyst embedded within, or encapsulated within, a polymer/copolymer that is susceptible to degradation by ionizing radiation. The catalyst can include an oxidizing agent and/or a metal oxide. Application of ionizing radiation (e.g. e-beam or gamma radiation) to the coated thermoplastic may cause physical/chemical degradation of the polymer/copolymer, exposing the catalyst to the bonding interface between the thermoplastic and the coating. Subsequent application of heat and/or mechanical force to the coated thermoplastic may cause or expedite catalytic degradation of the bonding interface between the thermoplastic and the coating, facilitating the uncoupling of the coating from the thermoplastic. Although the embodiments described herein may refer in some instances to articles comprising a thermoplastic layer, a coating and a bonding interface layer, it is to be understood that embodiments are not so limited, and articles may include one or more additional thermoplastic/coating layer and one or more additional bonding interface layers.

FIGS. 1-5 illustrate block diagrams of an article with a bonding interface layer comprising polymers and catalytic nanoparticles, arranged in accordance with at least some embodiments of the present disclosure. As shown in FIGS. 1-5, an article 100 may include a thermoplastic 120 coupled to a bonding interface layer 110 (see e.g. FIGS. 1 and 2). Bonding interface layer 110 may be coupled to a coating 140. Thermoplastic 120 may be a sheet of thermoplastic, an inner/outer wall of an article constituted with thermoplastic, or any object or article comprising a thermoplastic. As described above, thermoplastic 120 may comprise one or more polymers that exhibit leathery, rubbery or viscous flow at temperatures above a glass transition temperature or exhibit viscous flow at temperatures above a melting temperature and/or crystalline melting temperature. Thermoplastic 120 may comprise one or more polymers that can be re-melted and/or re-shaped after an initial molding/shaping. Thermoplastic 120 may comprise one or more polymers in a semi-crystalline and/or amorphous solid state. Thermoplastic 120 may include polypropylene and/or polyether. Thermoplastic 120 may be any shape and/or size, and may be configured as a component of an automotive/electronics device/apparatus.

Figure 2:
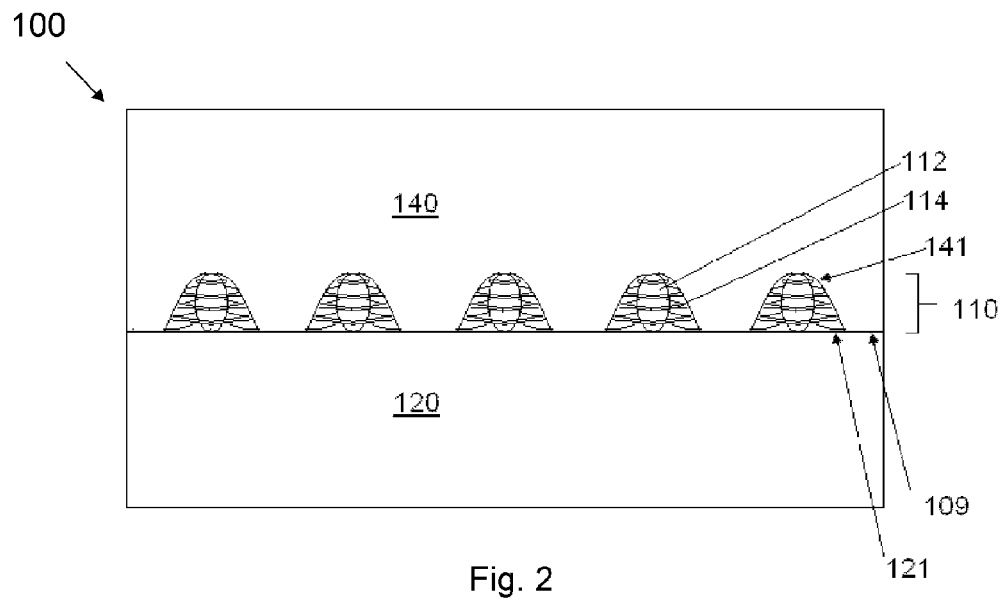

Bonding interface layer 110 may be coupled to thermoplastic 120 and may be further coupled to coating 140. Bonding interface layer 110 may be a layer of any thickness and may be continuous between thermoplastic 120 and coating 140 (see e.g. FIG. 1). Alternatively, bonding interface layer may be discontinuous or intermittent between thermoplastic 120 and coating 140 (see e.g. FIG. 2). As shown in FIG. 1, thermoplastic 120 and coating 140 may be physically separated by bonding interface layer 110. Alternatively, as shown in FIG. 2, thermoplastic 120 and coating 140 may be in direct physical contact and/or directly coupled along an interface 109 with other portions of their surfaces physically separated by bonding interface layer 110 and/or catalytic nanoparticles 112. Bonding interface layer 110 will be further described below.

Coating 140 may comprise one or more polymers/copolymers. Coating 140 and/or thermoplastic 120 may further comprise one or more non-polymer chemicals/additives provided to prevent damage from sources such as sunlight/ultraviolet light, mechanical stress, oxidation, heat, etc, to impart a color, scent, flavor, and/or texture, to retard microbial growth, to increase/decrease elasticity, to promote/inhibit adhesion, or to influence any chemical or physical property of a polymer/thermoplastic.

Figure 3:
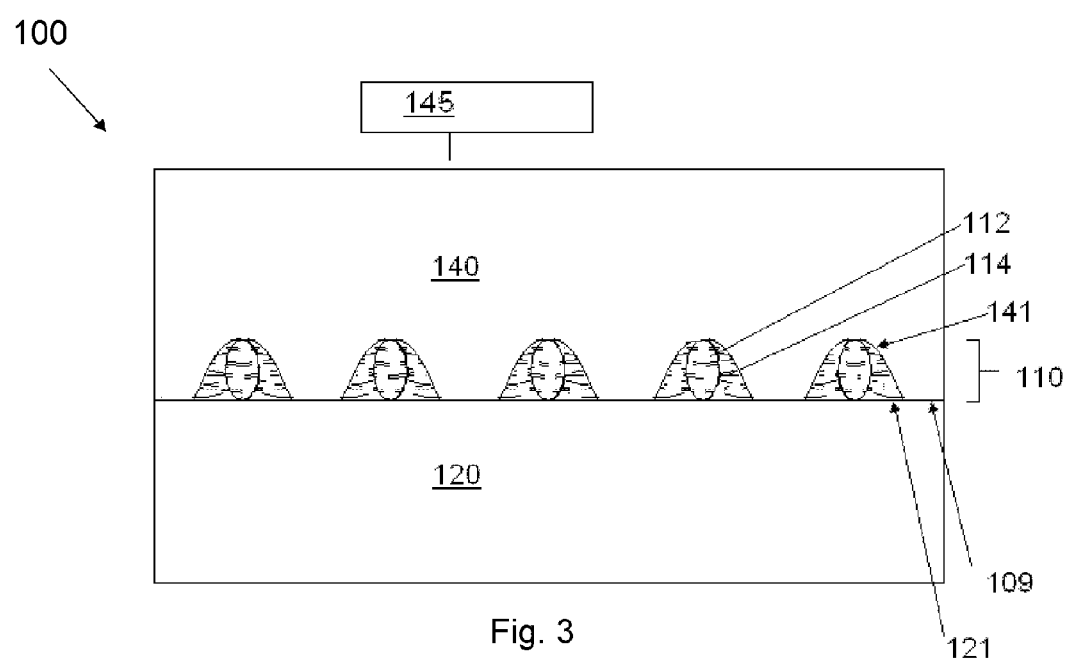

Continuing to refer to FIGS. 1-5, thermoplastic 120 may be coupled to bonding interface layer 110 along a first surface 121, and bonding interface layer 110 may be coupled to coating 140 along a second surface 141 (see e.g. FIGS. 1-3). Bonding interface layer 110 may include catalytic nanoparticles 112 embedded and/or encapsulated within polymers 114. In some embodiments, bonding interface layer 110 may be applied to thermoplastic 120 as a semi-crystalline and/or amorphous solid, while in other embodiments, bonding interface layer 110 may be applied to thermoplastic 120 as a fluid/liquid/suspension/latex. Similarly, coating 140 may be applied to bonding interface layer 110 and thermoplastic 120 as a solid and/or as a fluid/liquid/suspension/latex.

Catalytic nanoparticles 112 may comprise a catalyst. In some embodiments, catalytic nanoparticles 112 may be composite nanoparticles comprising a catalyst at least partially encapsulated by one or more polymers. In other embodiments, a catalyst of catalytic nanoparticles 112 may comprise an oxidizing agent and/or oxidation catalyst, an oxide, a metal, a metal cation, an oxygen anion and/or a metal oxide. In still other embodiments, catalytic nanoparticles 112 may comprise catalysts embedded within one or more polymers. Alternatively, catalytic nanoparticles 112 may comprise a catalyst that is not encapsulated/embedded within polymers. Catalytic nanoparticles 112 may be partially or completely embedded within one or more polymers 114.

Figure 4:
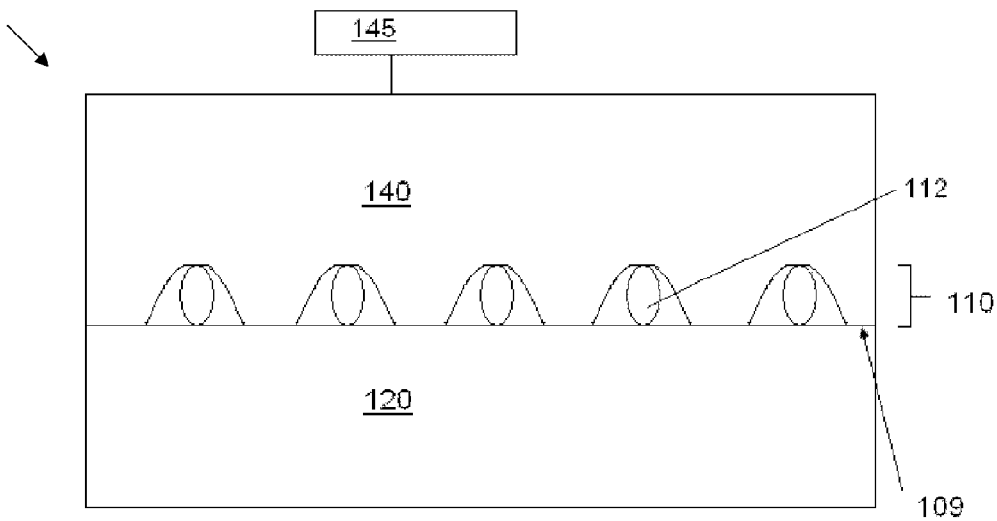

In some embodiments, polymers 114 may comprise one or more radiatively unstable polymers and/or may have one or more unstable radiative characteristics as described above. Polymers 114 may be at least partially degradable by exposure to ionizing radiation, as shown in FIGS. 3 and 4. In some examples, polymers may be at least partially degradable by an ionizing radiation dose of 5 kGy or less. In other examples, polymers 114 may be at least partially degraded by an ionizing radiation dose of less than about 10 kGy, less than about 50 kGy, less than about 100 kGy, or less than about 1000 kGy. Degradation (in full or in part) of polymers 114 by a suitable ionizing radiation dose may expose catalytic nanoparticles 112 to oxygen, to a surface of thermoplastic 120 and/or to a surface of coating 140. Polymers 114 may be arranged on a surface of thermoplastic 120 and/or within bonding interface layer 110 to maximize oxygen permeability of bonding interface layer 110. Polymers 114 and/or catalytic nanoparticles 112 may comprise one or more of propylene, ether, polypropylene and/or polyether as one or more copolymers. Polymers 114 and/or catalytic nanoparticles 112 may comprise polymers similar to, identical to, and/or suitable for adhesion to both thermoplastic 120 and coating 140. For example, each of thermoplastic 120 and coating 140 may comprise at least one of polypropylene and/or polyether, and polymers 114/catalytic nanoparticles 112 may comprise a copolymer that includes both propylene and ether.

While catalytic nanoparticles 112 may be shown in FIGS. 1-5 disposed as a single discontinuous layer within bonding interface layer 110, this arrangement is merely an example, and catalytic nanoparticles 112 may also be disposed between thermoplastic 120 and coating 140 in other arrangements such as in a continuous layer, multiple layers, clusters, etc. Similarly, while polymers 114 may be shown in FIG. 1 disposed continuously throughout bonding interface layer 110 with catalytic nanoparticles 112 embedded therein, this arrangement is merely an example, and polymers 114 may also be disposed discontinuously within bonding interface layer 110 (see e.g. FIGS. 2 and 3), in alternate chain orientations, in single or multiple layers, in clusters, etc. In addition, relative proportions of thermoplastic 120, coating 140 and bonding interface layer 110 may vary among embodiments, and one or more of these components may vary in one or more dimensions such as thickness. For example, bonding interface layer 110, thermoplastic 120 and/or coating layer 140 may be less than 100 nm thick, 100 nm-200 nm thick, 100-1000 nm thick, etc. Bonding interface layer 110 may be thinner or thicker than bonding interface layer 110 and/or thermoplastic 120.

In some embodiments, catalytic nanoparticles 112 may comprise one or more elements or compounds that participate in oxidation catalysis. Catalytic nanoparticles 112 may comprise a metal oxide in one or more forms and/or structures. For example, catalytic nanoparticles 112 may include titanium dioxide in one or more forms (e.g. rutile, anatase, brookite, etc.) and/or crystal structures (e.g. monoclinic, orthorhombic, tetragonal, cubic, etc.). As another example, catalytic nanoparticles 112 may include both anatase and rutile forms of titanium dioxide. Catalytic nanoparticles 112 may be spiked/doped with one or more ions, metal oxides or other additives known in the art to influence catalytic activity.

Referring now to FIGS. 3 and 4, catalytic nanoparticles 112 may be released from polymers 114 by degradation of polymers 114 as a result of ionizing radiation applied to interface layer 110. Exposure of article 100 to a radiation source 145 may cause degradation of polymers 114 by chain scission and/or other processes described above. Degradation of polymers 114 may release catalytic nanoparticles 112 in bonding interface layer 110. FIG. 3 shows partial degradation of polymers 114 from exposure ionizing radiation from a radiation source 145. FIG. 4 shows complete degradation of polymers 114 from exposure to ionizing radiation from radiation source 145. In some examples, release of catalytic nanoparticles 112 from polymers 114 may occur as a result of partial degradation of polymers 114.

Figure 5:
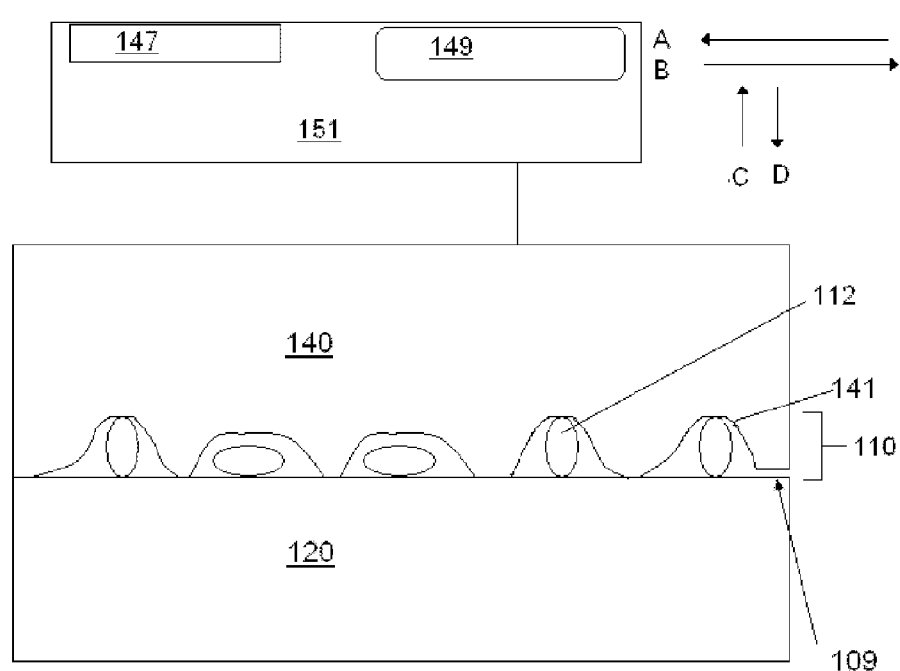

Referring now to FIG. 5, exposure of article 100 to heat from a heat source 147 and/or force from a mechanical stress device 149 may initiate or enhance catalytic degradation of bonding interface layer 110 and/or interface 109 (see also FIG. 4). Catalytic degradation of bonding interface 110 and/or interface 109 may cause or contribute to an adhesive failure between thermoplastic 120 and coating 140 (e.g. at interface 109). Adhesive failure may result in uncoupling/separation of thermoplastic 120 from coating 140. Heat source 147 and/or mechanical stress device 149 may be components of a separating apparatus 151. Separating apparatus 151 may be a component of a system such as system 700, illustrated in FIGS. 11 and 12.

Figure 6:
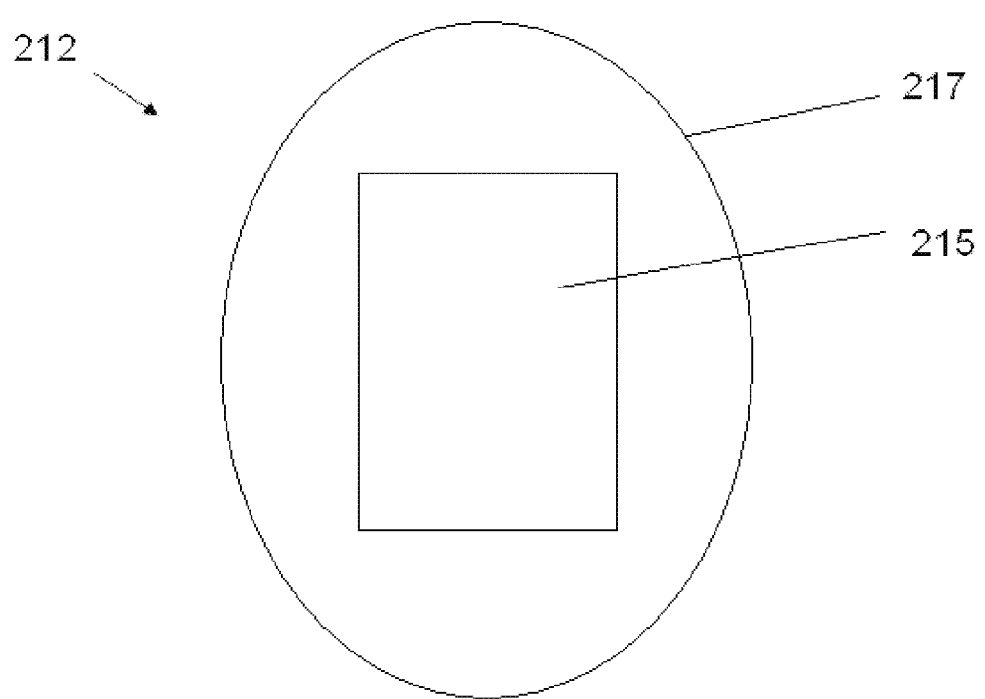
FIG. 6 illustrates a block diagram of a composite nanoparticle.

FIG. 6 illustrates a block diagram of a composite nanoparticle arranged in accordance with at least some embodiments of the present disclosure. As shown, a composite nanoparticle 212 may include a catalyst 215 at least partially coated by, and/or encapsulated within, polymer 217. Polymer 217 may be a single polymer/copolymer or may include two or more polymers/copolymers. Coating/encapsulation of catalyst 215 may occur by any method, including (but not limited to) homogenization, sonication, precipitation, and/or spraying of catalyst 215 with a solution comprising polymer 217 and/or subunits of polymer 217. Polymer 217 may comprise one or more radiatively unstable polymers and/or may have one or more unstable radiative characteristics. A composite nanoparticle 212 may be at least partially degraded under the conditions described above with regard to polymer 114. Polymer 217 of a composite nanoparticle may be at least partially surrounded by polymers 114 as shown in FIGS. 1 and 2. Catalyst 215 may comprise any catalyst, metal oxide and/or other element described above in reference to nanoparticles 112.

In some embodiments, polymer 217 and polymers 114 may be degraded by ionizing radiation at the same rate, while in other embodiments polymer 217 and polymers 114 may be degraded by ionizing radiation at different rates. For example, polymers 114 may be degraded more rapidly by ionizing radiation than polymer 217, while in another embodiment polymer 217 may be degraded more rapidly by ionizing radiation than polymers 114. Catalyst 215 may be a structure with one, two or three dimensions measuring about 100 nm or less. A composite nanoparticle comprising a catalyst 215 and polymer 217 may be 100 nm or less in one, two, or three dimensions.

Figure 7:
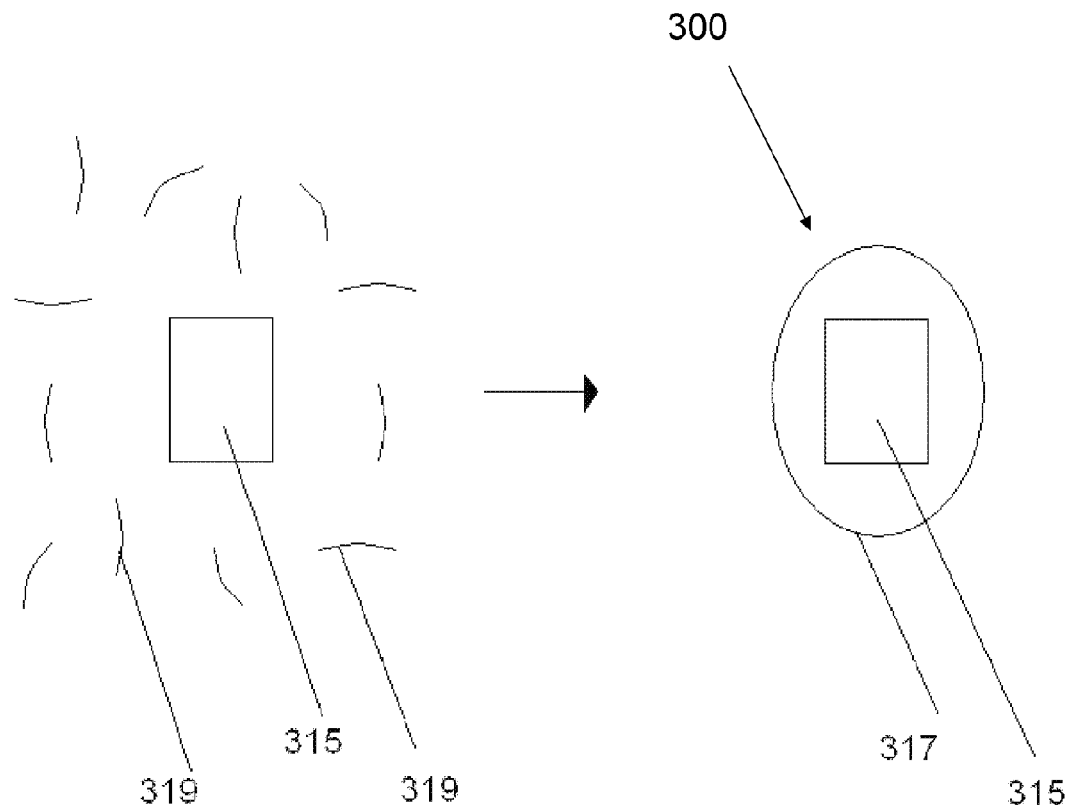
FIG. 7 illustrates formation of a composite nanoparticle including a catalyst and one or more polymers.

FIG. 7 illustrates formation of a composite nanoparticle including a catalyst and one or more polymers, in accordance with at least some embodiments of the present disclosure. As shown, a catalyst 315 may be combined with polymers/monomers 319 to form a composite nanoparticle 300. Polymers/monomers 319 may form a polymer shell 317 that partially or fully surrounds/encapsulates catalyst 315, resulting in formation of composite nanoparticle 300. Formation of polymer shell 317 and/or encapsulation of catalyst 315 may occur through formation of chemical bonds among polymers/monomers 319 and/or mechanical entanglement of polymers/monomers 319. Polymers/monomers 319 may comprise one or more radiatively unstable polymers/copolymers, and polymer shell 317 may be a radiatively unstable polymer shell. Polymers/monomers 319 and/or polymer shell 317 may have one or more unstable radiative characteristics that influence the rate of degradation from exposure to ionizing radiation.

Composite nanoparticle 300 may be formed by any suitable encapsulation method. Such methods are known in the art and are intended to be encompassed by this Disclosure. For example, catalyst 315 may be added to polymers/monomers 319 that are in a fluid/liquid state. Alternatively, catalyst 315 and polymers/monomers 319 may be combined in fluid suspension. As still another example, catalyst 315 may be sprayed with a fluid/liquid/suspension comprising polymers/monomers 319, or polymers/monomers 319 may be sprayed with catalyst 315. A polymer/monomer 319 may form one or more chemical bonds with, or become mechanically entangled with, another polymer/monomer 319 while in a fluid/liquid state, while in suspension, after addition of a polymerization catalyst, during loss of fluid/water from the fluid/liquid/suspension (e.g. after spraying), and/or through any suitable process known in the art.

Figure 8:
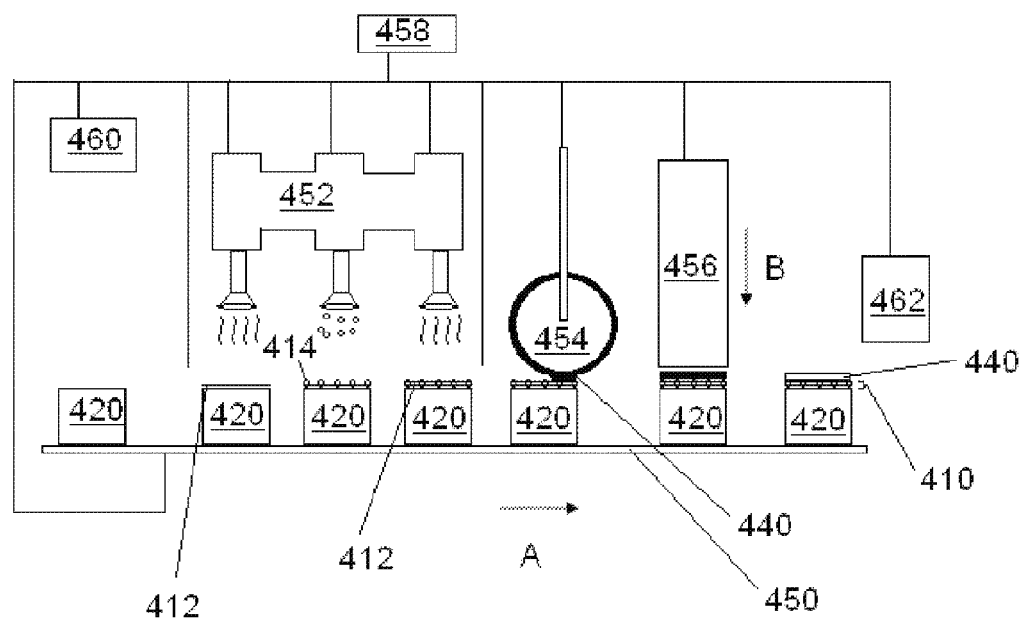
FIG. 8 illustrates a system for application of a coating to a thermoplastic over a bonding interface layer comprising polymers and catalytic nanoparticles.

FIG. 8 illustrates a system for application of a coating to a thermoplastic over a bonding interface layer comprising polymers and catalytic nanoparticles, in accordance with at least some embodiments of the present disclosure. System 400 may be integrated with other components of a manufacturing system/facility (e.g. auto parts manufacturing facility, plastics manufacturing facility, food/beverage container manufacturing facility, etc.). Alternatively, system 400 may be a stand-alone system used for coating thermoplastics.

As shown for the illustrated system 400, a bonding interface layer 410 may be applied to a thermoplastic 420 by spraying. In various embodiments, polymers 412 and/or catalytic nanoparticles 414 may be applied as a fluid, solid, liquid, suspension and/or latex by any deposition method, including spraying, dip coating, injection molding, powder coating, dip molding, spraying, and/or by any other suitable method known in the art for applying a polymer to a thermoplastic. Bonding interface layer 410 may comprise polymers, catalytic nanoparticles embedded within the polymers, and/or composite nanoparticles including a catalyst and polymers, as discussed above. One or more polymers of bonding interface layer 410 may be radiatively unstable polymers and/or may have one or more unstable radiative characteristics, as discussed above. A coating 440 may be applied over the surface of bonding interface layer 410. Alternatively, bonding interface layer 410 may be applied to coating 440 prior to application of bonding interface layer 410 to thermoplastic 420.

As illustrated, thermoplastic 420 (such as an article, an object, a sheet of thermoplastic, etc.) may be conveyed along a conveyor 450 in the direction of Arrow A. Alternatively, thermoplastic 420 may be conveyed by other means or may remain in place during application of bonding interface layer 410 and/or coating 440. A conditioning device 460 may be used to prepare thermoplastic 420 for coating. Conditioning device 460 may be a cleaning device configured to remove dust or debris from a surface of thermoplastic 420 or an abrasion device configured to increase the surface area of thermoplastic 420 (e.g. for improved adhesion to a coating). Conditioning device 460 may comprise a heating/cooling device for bringing a surface of thermoplastic 420 to a temperature suitable for bonding or coating (e.g. heating to a temperature above the glass transition temperature).

Polymers 412 and catalytic nanoparticles 414 may be applied to thermoplastic 420 by a first applicator 452 in one, two, three or more processes. First applicator 452 may be a sprayer, a roller, a dip coating apparatus, or any other device for depositing a substance onto thermoplastic 420. As shown, first applicator 452 may be a sprayer that sprays polymers 412 before and after spraying catalytic nanoparticles 414. Alternatively, first applicator 452 may spray, coat, or otherwise deposit a liquid, solid or semi-solid composition that comprises catalytic nanoparticles 414 and polymers 412 in a single step. Polymers 412 and catalytic nanoparticles 414 may form a binding interface layer 410 on a surface of thermoplastic 420. First applicator 452 may further comprise a component for curing or hardening binding interface layer 410, such as a UV light source or a heating/cooling device that controls the temperature of the air and/or binding interface 414. First applicator 452 may be housed in a separate chamber that may be environmentally controlled, such as for pressure (e.g. vacuum), temperature, dust/debris exclusion, etc.

A second applicator 454 may be used to apply a coating 440 over binding interface 414. Second applicator 454 may be a sprayer, a roller, or any other device for depositing a coating onto a surface. As shown, second applicator 454 may be at least partially covered along its exterior by a coating substance. The coating substance may be transferred from the surface of the roller to a surface of binding interface 414 through physical contact and/or through gravitational flow of the coating substance down the exterior of the second applicator 454. While second applicator 454 is shown as a roller, second applicator 454 may also be a dip apparatus, a sprayer, or other device.

A bonding apparatus 456 may be used to induce or enhance bonding between layers and/or to cure, harden, or stabilize any of the layers. Bonding apparatus 456 may comprise a pressure device for applying downward pressure in the direction shown by Arrow B. Bonding apparatus 456 may comprise a heating/cooling device, a curing device such as a UV light source, a drying device such as a fan and/or exhaust, or any other suitable device.

Auxiliary apparatus 462 may also be included within system 400 and may comprise one or more devices for environment control such as a sensor (e.g. temperature sensor, contaminant sensor, humidity sensor, pressure sensor, etc.), a temperature control, a solvent removal device, an air filter, etc. Auxiliary apparatus 462 may be in communication with one or more sensors of conveyor 450, conditioning device 460, first applicator 452, second applicator 454, bonding apparatus 456, and/or auxiliary apparatus 462. Auxiliary apparatus may comprise a manual control for stopping, starting, or otherwise adjusting operation of any or all components of system 400.

A controller 458 may be operably coupled to any or all of conveyor 450, conditioning device 460, first applicator 452, second applicator 454, bonding apparatus 456, auxiliary apparatus 462, and/or one or more sensors of any of these components. Controller 458 may automatically control one or more operating conditions/processes automatically. Controller 458 may comprise a computing device (e.g. example computing device of FIG. 9) and may be endowed with instructions for controlling any/all components of system 400.

Any combination of suitable techniques may be applied to thermoplastic 420, bonding interface layer 410 and/or coating 440 to cause or enhance bonding between two or more layers. Suitable techniques may include, but are not limited to, applying heat and/or pressure, flame treatment, plasma treatment, solvent bonding, welding techniques, curing, and/or addition of an adhesion promoter. Welding techniques can include, but are not limited to, ultrasonic welding, friction welding, heated tool welding, spin welding, induction welding, radio frequency welding, microwave welding, resistance welding, extrusion welding, electrofusion welding, infrared welding, and/or laser welding. One or more layers may be applied and/or bonded to another layer by injection molding, dip coating, powder coating, dip molding, spraying, and/or by any other suitable technique. One or more layers may be bonded under environmental conditions such as sub-atmospheric pressure (e.g. vacuum) or high pressure, low humidity, low oxygen/high nitrogen, high/low temperature, and other suitable environmental conditions known in the art.

Any device, apparatus or combination of devices/apparatuses known in the art for applying a coating to an article or object may be used to apply one or more components of bonding interface layer 410, coating 440 or thermoplastic 420 to any other component or article. Such devices/apparatuses may comprise a sprayer, a roller, a wheel applicator, a brush, an extruder, a dip/powder tank, a press, a mold and/or injection molding apparatus, a tumbler, a conveyor, a heat source, a radiation/light source, a welder, and/or any other device or apparatus for use in practicing any of the techniques listed above. Devices suitable for applying stress, pressure, force, and/or heat to an article may also be used for bonding one or more components of bonding interface layer 410, coating 440 or thermoplastic 420 to any of these layers.

Figure 9:
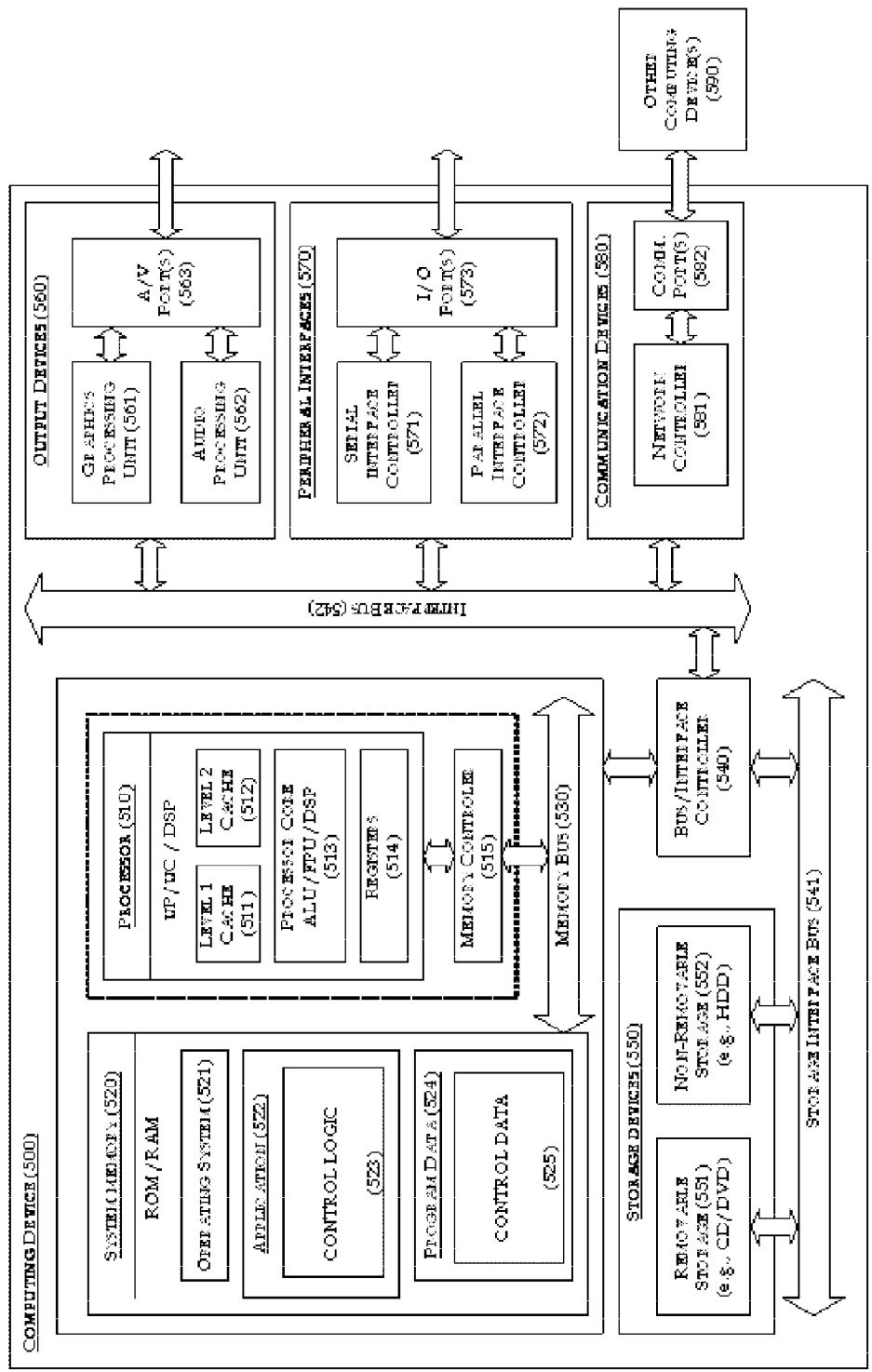
FIG. 9 illustrates a illustrates a block diagram of a computing device.
Figure 11:
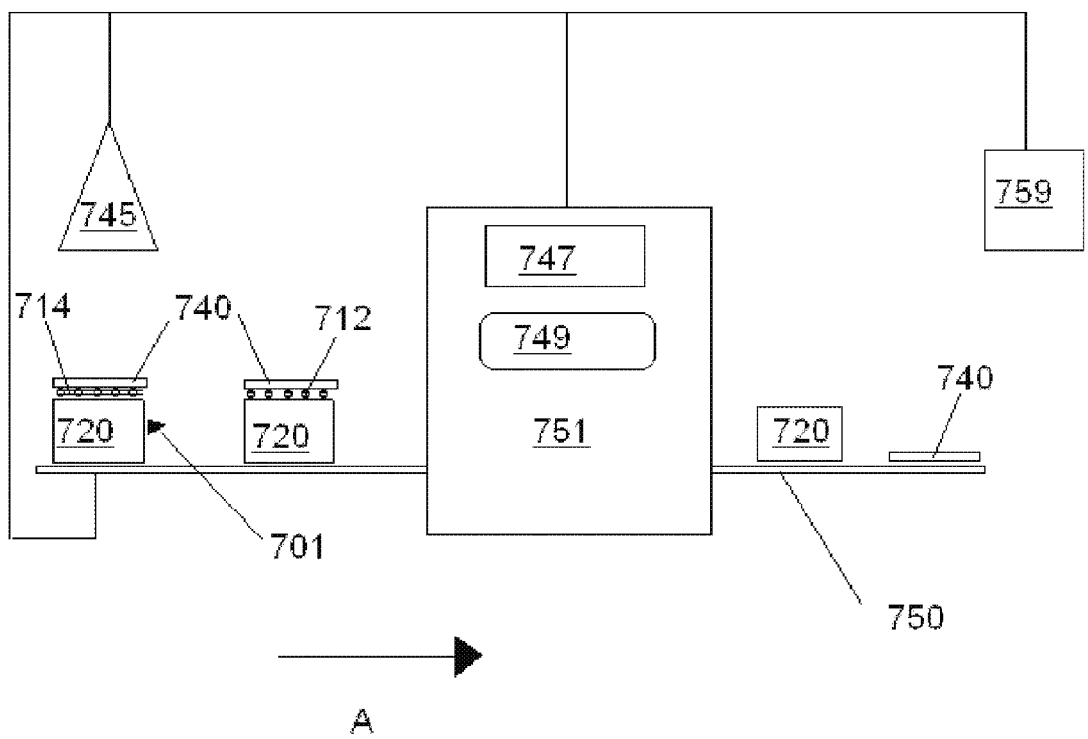
FIGS. 11-12 illustrate a system for removal of a coating layer from a thermoplastic; and, FIG. 13 illustrates a flow chart of a coating removal method for removing a coating from a thermoplastic; all arranged in accordance with at least some embodiments of the present disclosure.

FIG. 9 illustrates a block diagram of a computing device configured in accordance with the present disclosure. Such a computing device may be used to control one or more components of system 400, illustrated in FIG. 8, as further described below. Alternatively, such a computing device may be used to control one or more components of system 700, as shown in FIG. 11. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 may include one more levels of caching, such as a level one cache 511 and a level two cache 12, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include control logic 523 to assist in practicing one or more aspects of one or more methods of the present disclosure for controlling, coordinating, and/or synchronizing components of a system for coating a thermoplastic (e.g. system 400, FIG. 8), such as conveyor 450, conditioning device 460, first applicator 452, second applicator 454, bonding apparatus 456, auxiliary apparatus 462, and/or one or more sensors of any of these components. Application 522 may include control logic 523 configured to assist, but not limited to, in controlling environmental conditions such as air pressure, temperature, oxygen/nitrogen levels, humidity, etc. Program Data 524 may include control data 525. Control data 525 may comprise data created and/or otherwise used by control logic 523 to assist in practicing one or more aspects of one or more methods of the present disclosure.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, communication interfaces) to the basic configuration 501 via the bus/interface controller 540. Example output devices 560 include a graphics processing unit 561 and an audio processing unit 562, which may be configured to communicate to various external devices, such as a display or a speaker, via one or more NV ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., a printer, a scanner, conveyor 450, conditioning device 460, first applicator 452, second applicator 454, bonding apparatus 456, auxiliary apparatus 462, and/or one or more sensors of any of these components) via one or more I/O ports 573. An example communication device 580 may include a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of, any of the above functions. Computing device 500 may also be implemented as a personal computer including both laptop computer and non-laptop computer configurations, an application specific device, and/or a hybrid device. Computing device 500 may include one or more functions of a small-form factor portable (or mobile) electronic device such as a cell phone, a personal data assistant (PDA), a personal media player device, a wireless web-watch device, or a personal headset device.

FIG. 10 illustrates a flow chart of a coating method including application of a bonding interface layer and a coating layer to a thermoplastic in accordance with at least some embodiments of the present disclosure. Devices, apparatuses, techniques, materials and processes shown in FIGS. 1-9 and described in the accompanying text of the specification may be used to perform method 600. Method 600 illustrates one or more operations, functions, or actions as illustrated by one or more of blocks 601, 603, 605, 607 and/or 609. It will also be appreciated that in some examples various blocks may be eliminated, divided into additional blocks, and/or combined with other blocks. Processing for method 600 may start at block 601.

At block 601, processing may comprise "Prepare a thermoplastic for application of a bonding interface layer to a surface of the thermoplastic." At block 601, a thermoplastic may be prepared for application of a bonding interface layer as described above. A thermoplastic can include a thermoplastic article or object, a sheet of thermoplastic, an outer wall of an article where the outer wall is constituted with thermoplastic, or any other thermoplastic item. Preparing a thermoplastic may include applying heat and/or pressure, cleaning the thermoplastic, abrading a surface of the thermoplastic, applying a solvent, and/or altering one or more environmental conditions. Alternatively, method 600 may begin at block 603 without the preparation of block 601.

From block 601, method 600 may proceed to block 603, "Apply catalytic nanoparticles and polymers to the thermoplastic surface, wherein the polymers have an unstable radiative characteristic to facilitate removal of the coating through degradation of the bonding interface using at least in part a radiative process." At block 603, catalytic nanoparticles and polymers may be applied separately or as an integrated substance, and may be applied as one or more solids, fluidized solids or semi-solids (e.g. powders, gels, pastes) or fluid layers. Application of catalytic nanoparticles and polymers may proceed as a single process or as two, three or more sequential or simultaneous processes. Catalytic nanoparticles and polymers may be applied by spraying (see e.g. FIG. 8) or by other methods as described above. The catalytic nanoparticles may be embedded/encapsulated within the polymers on a surface of the thermoplastic, forming a bonding interface layer. Polymers applied with catalytic nanoparticles at block 603 may be susceptible to degradation through application of ionizing radiation, as illustrated in FIGS. 3 and 4.

From block 603, method 600 may proceed to block 605, "Prepare the bonding interface layer and/or thermoplastic for application of a coating to the bonding interface layer and/or thermoplastic." At block 605, the bonding interface layer and/or thermoplastic may be processed as described above with reference to FIG. 8. Alternatively, method 600 may proceed from block 603 to block 607 without the processing of block 605.

From block 605/603, method 600 may proceed to block 607, "Apply the coating over the bonding interface layer." At block 605, a coating may be applied as described with reference to FIG. 8. The coating may be applied to the surface of the bonding interface layer/thermoplastic to protect the thermoplastic, wherein the polymers have an unstable radiative characteristic to facilitate removal of the coating through breaking down of the bonding interface using at least in part a radiative process (see e.g. FIGS. 3-5).

Figure 12:
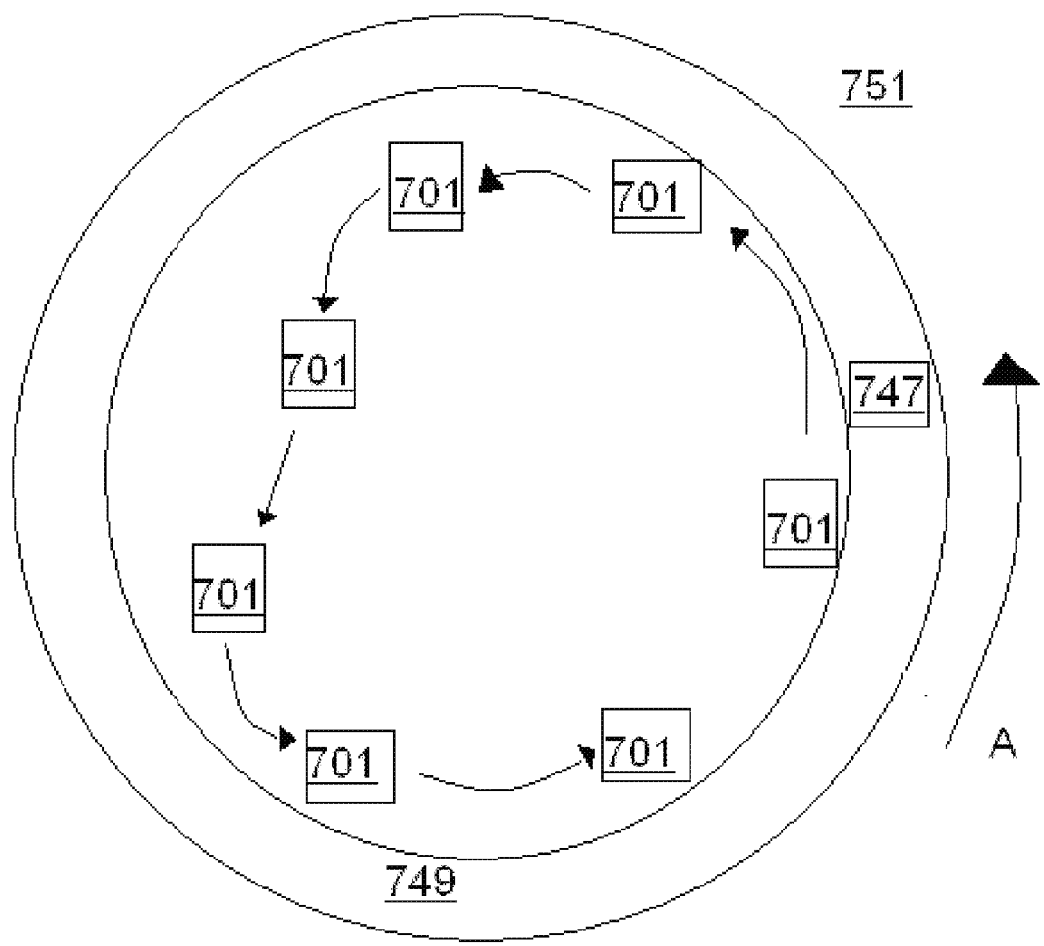

FIGS. 11-12 illustrate a system for removal of a coating from a thermoplastic, in accordance with at least some embodiments of the present disclosure. System 700 may be integrated with other components of a system/facility (e.g. recycling facility, plastics recycling facility, manufacturing facility, etc.). Alternatively, system 700 may be a stand-alone system for removing coatings from thermoplastics.

As shown in FIG. 11, an article 701 comprising thermoplastic 720, polymers 714, catalytic nanoparticles 712, and a coating 740 may be conveyed along a conveyor 750 in the direction indicated by Arrow A. Article 701 may be exposed to ionizing radiation from a radiation source 745. Polymers 714 may be radiatively unstable such that they may be degraded by application of ionizing radiation. As illustrated, article 701 may be exposed to ionizing radiation source 745, which may emit gamma radiation and/or e-beam radiation. Exposure of article 701 to ionizing radiation from ionizing radiation source 745 may cause degradation of polymers 714 that surround/encapsulate catalytic nanoparticles 712 (see e.g. FIGS. 3 and 4). Degradation of polymers 714 may release catalytic nanoparticles 712 between coating 740 and thermoplastic 720. Emission of ionizing radiation from ionizing radiation source 745 and/or exposure time of an article to ionizing radiation source 745 may be increased, decreased, and/or adjusted based dimensions and/or composition of article 701.

After exposure to ionizing radiation source 745, article 701 may be conveyed along conveyor 750 to engage a separation apparatus 751. Separation apparatus 751 may comprise one or more of a heat source 747 and/or mechanical stress device 749. Mechanical stress device 749 may apply mechanical stress to article 701 by inducing motion and/or vibration, applying force or pressure, tumbling, or otherwise physically manipulating article 701.

In some embodiments, separation apparatus 751 may apply a combination of heat and mechanical stress to thermoplastic 720 and/or coating 740 to promote/enhance catalytic degradation of an interface by catalytic nanoparticles 712, also shown in FIG. 5. Thermoplastic 720 and/or coating 740 may be heated by heat source 747 to a temperature below the glass transition state temperature of the thermoplastic/coating. Mechanical force may be applied by separation apparatus 751 in the form of collisions between an article and a surface of mechanical stress device 749 and/or collisions between two or more articles within mechanical stress device 749. The collisions may push, pull, press, stretch, twist, bend, or otherwise manipulate the article, enhancing catalytic degradation of the interface between thermoplastic 720 and coating 740 by catalytic nanoparticles 712.

FIG. 12 illustrates a block diagram of a separation apparatus 751 comprising a mechanical stress device 749 and a heat source 747, in accordance with some embodiments of the present disclosure. Mechanical stress device 749 may comprise a rotary drum or tumbler, a wet sonication device, a dry sonication device, a vibration-inducing device, a shaker, or an agitator. An article 701 comprising a thermoplastic, bonding interface layer and a coating (see FIG. 11) may be tumbled in mechanical stress device 749 in a direction of rotation indicated by Arrow A. As article 701 is tumbled in mechanical stress device 749, article 701 collides with interior surfaces and/or other articles 701. Heat source 747 may heat an interior area of mechanical stress device 749 and/or article 701. Alternatively, mechanical stress device 749 may not include a heat source 747, or heat source 747 may apply heat before/after rotation of mechanical stress device 749. Mechanical stress device 749 may instead apply downward, lateral, upward, oblique, and/or shear forces to article 701, such as by repetitive applications of a movable part against article 701. As another alternative, mechanical stress device 749 may apply force against article 701 using sound waves, a pressurized fluid, sliding/rotating compression, or other means of inducing mechanical stress.

Referring again to FIG. 11, application of heat and/or mechanical stress to article 701 by separation apparatus 751 and the catalytic degradation of the interface may uncouple the coating 740 from the thermoplastic 720. Coating 740 and/or thermoplastic 720 may exit separation apparatus 751 individually after they are uncoupled, as shown. Uncoupled coating 740 and/or thermoplastic 720 may be sorted or removed from separation apparatus 751 according to weight, shape, size, or any other property. Coating 740 and/or thermoplastic 720 may exit separation apparatus 751 on conveyor 750. Coating 740 and/or thermoplastic 720 may be subsequently processed for recycling/reuse.

In some embodiments, a controller 759 may be operably coupled to any or all of ionizing radiation source 745, separation apparatus 751, heat source 747, mechanical stress device 749, conveyor 750, and/or one or more sensors of any of these components. Controller 759 may automatically control one or more of the described operations, conditions or processes automatically.

Controller 759 may comprise a computing device and may be endowed with instructions for controlling any/all components of system 700. For example, a controller 759 may comprise a computing device essentially as illustrated in FIG. 9. With reference to FIG. 9, a computing device 500 of a controller 759 may comprise a system memory 520 with an operating system 521, one or more applications 522, and program data 524. Application 522 may include control logic 523 to implement one or more algorithms for controlling, coordinating, and/or synchronizing components of system 700, such as ionizing radiation source 745, separation apparatus 751, heat source 747, mechanical stress device 749, conveyor 750, and/or one or more sensors of any of these components. Application 522 may include control logic 523 to implement one or more algorithms for controlling environmental conditions such as air pressure, temperature, oxygen/nitrogen levels, humidity, etc. Algorithms may include algorithms for implementing a separation method such as the method illustrated in FIG. 13. Program Data 524 may include control data 525. Control data 525 may comprise data for implementing one or more of the algorithms described above. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., a printer, a scanner, ionizing radiation source 745, separation apparatus 751, heat source 747, mechanical stress device 749, conveyor 750, and/or one or more sensors of any of these components) via one or more I/O ports 573. Other components of computing device 500 may retain the functions already described with reference to FIG. 9.

FIG. 13 illustrates a flow chart of a coating removal method for removing a coating from a thermoplastic in accordance with at least some embodiments of the present disclosure. Devices, apparatuses, techniques, materials and processes shown in FIGS. 1-5, 9, 11 and 12 and described in the accompanying text of the specification may be used to perform method 800. Method 800 illustrates one or more operations, functions, or actions as illustrated by one or more of blocks 801, 803, and/or 805. It will also be appreciated that in some examples various blocks may be eliminated, divided into additional blocks, and/or combined with other blocks. Processing for method 800 may start at block 801.

At block 801, processing may comprise "Apply ionizing radiation to an article comprising an interface layer disposed between a thermoplastic and a coating, the interface layer comprising catalytic nanoparticles and polymers, wherein the polymers have one or more radiatively unstable characteristics, and wherein the application of ionizing radiation to the interface layer causes degradation of the polymers and/or release of the catalytic nanoparticles." At block 801, ionizing radiation may be applied to an article comprising a coating layer, a bonding interface layer and a thermoplastic, the bonding interface layer being disposed between and coupled to the thermoplastic surface and the coating layer as shown in FIGS. 3, 4 and 11.

From block 801, method 900 may proceed to block 803, "Apply at least one of heat and/or mechanical force to the article to enhance catalytic degradation of an interface between the thermoplastic and the coating by the catalytic nanoparticles, the catalytic degradation and application of heat and/or mechanical force causing separation of the thermoplastic and the coating." At block 803, heat and/or mechanical force may be applied to the article as described with reference to FIGS. 5, 11 and 12. Mechanical force may be used at block 803 to push, pull, press, stretch, twist, bend, or otherwise physically manipulate an article in any suitable manner to promote/enhance catalytic degradation and/or to separate the coating layer from the thermoplastic surface. Heat may be applied to the thermoplastic surface, coating layer, and/or bonding interface layer to promote/enhance catalytic degradation and/or to separate the coating layer from the thermoplastic surface. Any or all of the components of the article, including the thermoplastic surface, coating layer and/or bonding interface layer, may be heated to a temperature that is below a glass transition temperature for the article/component(s). At block 803, the thermoplastic layer may become uncoupled from the coating layer as shown in FIG. 11.

From block 803, method 800 may proceed to block 805, "Process the thermoplastic and the coating separately" At block 805, the coating layer may be processed separately from the thermoplastic surface, and the coating layer and the thermoplastic surface may be recycled and/or disposed of separately.

In various embodiments, methods, articles, compositions, systems and processes related to removal of a coating from a thermoplastic surface are provided. In example embodiments, a computing system may be employed to initiate, monitor, regulate and/or otherwise control performance of one or more steps of methods as disclosed herein.

The herein-described subject matter sometimes illustrates different components or elements contained within, coupled to, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or Figures, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A method for coating a thermoplastic surface of an article of manufacture, the method comprising:
    applying a discontinuous bonding interface layer to the thermoplastic surface, wherein the discontinuous bonding interface layer comprises catalytic nanoparticles and a radiatively unstable polymer surrounding the catalytic nanoparticles; and
    applying a coating to the discontinuous bonding interface layer;
    wherein the radiatively unstable polymer releases some of the catalytic nanoparticles in response to exposure to ionizing radiation, enabling removal of the coating from the article.

2. The method of claim 1, wherein applying the discontinuous bonding interface layer to the thermoplastic surface comprises applying composite particles to the thermoplastic surface,
    wherein the composite particles include at least one of the catalytic nanoparticles encapsulated by the radiatively unstable polymer, and
    wherein the composite particles do not exceed 100 nm in at least one dimension.

3. The method of claim 1, wherein applying the discontinuous bonding interface layer comprises spraying the thermoplastic surface with a fluid and/or latex, the fluid and/or latex comprising the catalytic nanoparticles and the radiatively unstable polymer.

4. The method of claim 1, wherein the catalytic nanoparticles do not exceed about 100 nm in at least one dimension.

5. The method of claim 1, wherein the catalytic nanoparticles comprise one or more of: an oxidizing agent, a metal oxide, a catalyst, or a polymer.

6. The method of claim 5, wherein the catalyst comprises titanium dioxide.

7. The method of claim 1, wherein applying the discontinuous bonding interface layer comprises sequentially applying the radiatively unstable polymers and the catalytic nanoparticles, the catalytic nanoparticles comprising a catalyst.

8. The method of claim 1, wherein applying the discontinuous bonding interface layer comprises applying a discontinuous polypropylene or polyether bonding interface.

9. The method of claim 1, wherein applying the coating comprises spraying the discontinuous bonding interface layer with a fluid comprising at least one component of the coating.

10. The method of claim 1, wherein applying the discontinuous bonding interface layer comprises applying the discontinuous bonding interface layer as a solid or semi-solid composition comprising one or more of: the polymers or the catalytic nanoparticles.

* * * * *

UNITED STATES PATENT AND TRADEMARK OFFICE
CERTIFICATE OF CORRECTION

PATENT NO. : 8,580,337 B2  
APPLICATION NO. : 12/618670  
DATED : November 12, 2013  
INVENTOR(S) : Sjong Page 1 of 1

It is certified that error appears in the above-identified patent and that said Letters Patent is hereby corrected as shown below:

In the Drawings

In Fig. 9, Sheet 7 of 11, in Box "(515)", in Line 1, delete "CONTROLER" and insert -- CONTROLLER --, therefor.

In Fig. 9, Sheet 7 of 11, delete Main Designator "500".

In the Specification

In Column 3, Line 39, delete "thallium (TI)," and insert -- thallium (Tl), --, therefor.

In Column 3, Line 41, delete "(UUq)," and insert -- (Uuq), --, therefor.

In Column 9, Lines 24-25, delete "binding interface 414." and insert -- binding interface 410. --, therefor.

In Column 9, Line 29, delete "binding interface 414." and insert -- binding interface 410. --, therefor.

In Column 9, Line 34, delete "binding interface 414" and insert -- binding interface 410 --, therefor.

In Column 10, Line 53, delete "two cache 12," and insert -- two cache 512, --, therefor.

In Column 11, Line 53, delete "NV ports" and insert -- A/V ports --, therefor.

In Column 13, Line 12, delete "605/603," and insert -- 605, --, therefor.

Signed and Sealed this  
Twenty-first Day of October, 2014

Michelle K. Lee  
*Deputy Director of the United States Patent and Trademark Office*